United States Patent
Phelps et al.

(10) Patent No.: US 7,513,921 B1
(45) Date of Patent: Apr. 7, 2009

(54) EXHAUST GAS FILTER APPARATUS CAPABLE OF REGENERATION OF A PARTICULATE FILTER AND METHOD

(75) Inventors: Amanda C. Phelps, Malibu, CA (US); Kevin W. Kirby, Calabasas Hills, CA (US); Daniel Gregoire, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 430 days.

(21) Appl. No.: 11/257,846

(22) Filed: Oct. 24, 2005

Related U.S. Application Data

(60) Provisional application No. 60/713,932, filed on Sep. 2, 2005.

(51) Int. Cl.
*B01D 46/00* (2006.01)
*F01N 3/027* (2006.01)

(52) U.S. Cl. ............ 55/282.3; 55/385.3; 55/482; 55/523; 55/524; 55/DIG. 5; 55/DIG. 10; 55/DIG. 30; 60/275; 60/297; 60/299; 60/311; 264/630; 264/631; 264/DIG. 48; 427/244; 427/250; 427/419.1

(58) Field of Classification Search ........... 55/282.2, 55/282.3, 385.3, 482, 523, 524, DIG. 5, DIG. 10, 55/DIG. 30; 60/275, 297, 299, 311; 95/273, 95/278; 264/628, 630, 631, DIG. 48; 427/244, 427/249.1, 250, 419.1
See application file for complete search history.

(56) References Cited

U.S. PATENT DOCUMENTS

| | | | | |
|---|---|---|---|---|
| 4,825,651 A * | 5/1989 | Puschner et al. | ....... | 55/DIG. 30 |
| 5,074,112 A | 12/1991 | Walton et al. | | |
| 5,087,278 A * | 2/1992 | Suzuki | ......... | 55/523 |
| 5,180,559 A * | 1/1993 | Ma | ............. | 422/180 |
| 5,423,904 A * | 6/1995 | Dasgupta | ....... | 55/523 |
| 5,453,116 A * | 9/1995 | Fischer et al. | .......... | 95/278 |
| 6,328,779 B1 | 12/2001 | He et al. | | |
| 6,379,407 B1 * | 4/2002 | Blackwell et al. | .......... | 55/282.3 |
| 6,540,816 B2 * | 4/2003 | Allie et al. | ............ | 95/278 |
| 6,709,489 B2 * | 3/2004 | Ament et al. | ............ | 95/278 |
| 6,908,498 B2 * | 6/2005 | Ament et al. | ............ | 95/278 |
| 7,303,603 B2 * | 12/2007 | Gregoire et al. | ........... | 55/282.3 |
| 2003/0061791 A1 * | 4/2003 | Barbier et al. | ............ | 55/282.3 |
| 2004/0011024 A1 * | 1/2004 | Williamson et al. | ........... | 60/275 |

OTHER PUBLICATIONS

Walton, Frank B., Hayward, Peter J., Wren, David J., Controlled Energy Deposition in Diesel Particulate Filters During Regeneration by Means of Microwave Irradiation, International Congress and Exposition, Detroit, Michigan, Feb. 26-Mar. 2, 1990.

Ning, Zhi, He, Yongsheng, Experimental Study on Microwave Regeneration Characteristics of Diesel Particulate After-Treatment System, Internation Spring Fuels & Lubricants Meeting, Dearborn, Michigan, May 3-6, 1999.

* cited by examiner

*Primary Examiner*—Jason M Greene
(74) *Attorney, Agent, or Firm*—Christopher R. Balzan

(57) ABSTRACT

An exhaust gas filter apparatus includes a particulate filter for collecting a particulate from an exhaust gas. The exhaust gas filter also includes a electromagnetic radiation resonator to heat a portion of the particulate to ignite the particulate and regenerate the particulate filter.

42 Claims, 7 Drawing Sheets

EXHAUST GAS FILTER APPARATUS CAPABLE OF REGENERATION OF A PARTICULATE FILTER AND METHOD

CROSS REFERENCE TO RELATED APPLICATION

This application claims the benefit of U.S. Provisional Application No. 60/713,932, filed on Sep. 2, 2005, by Phelps, et al., entitled EXHAUST GAS FILTER APPARATUS CAPABLE OF REGENERATION OF A PARTICULATE FILTER AND METHOD, herein incorporated by reference in its entirety.

ORIGIN OF THE INVENTION

This invention was made with government support under cooperative Agreement No. DE-FC-04-03AL67635 awarded by the Department of Energy. The government has certain rights in this invention.

BACKGROUND

A particulate filter is often used to filter a particulate from an exhaust gas, such as a diesel exhaust gas. As the diesel exhaust gas passes through the filter, the filter removes a soot particulate from the exhaust gas. In this way, the diesel exhaust gas is scrubbed by the filter.

As the filter collects the soot particulate, the filter becomes saturated with the soot particulate. The soot builds-up to the point where it clogs the filter, creates back pressure, and reduces engine efficiency. Further, the effectiveness of the filter decreases. To restore the effectiveness of the filter, and the engine to peak efficiency, the filter must be regenerated by removing soot particles from the filter. After regeneration, the filter can then effectively remove additional soot particles from the diesel exhaust, and may be regenerated again after the filter becomes resaturated.

In one technique, a particulate filter is thermally regenerated by heating the soot particulate in the filter to a combustion temperature. The soot particulate combusts in the filter and is expelled from the filter by the exhaust gas. This technique, however, requires heating the entire soot particulate in the filter to the combustion temperature, which may consume large amounts of energy.

Thermal regeneration of diesel particulate filters requires a considerably higher temperature than normally encountered in diesel exhaust. Although the temperature of diesel exhaust is typically in the range of 150 to 250 degrees centigrade, a temperature of 550 to 750 degrees centigrade is required to create a self-propagating thermal regeneration of a diesel particulate in a diesel particulate filter. Consequently, to achieve thermal regeneration, the temperature of the diesel exhaust, the diesel particulate filter, or a diesel particulate must be increased.

Known methods of heating the exhaust gas temperature include the use of electric heaters and fuel burners, and the injection of combustibles and catalysts into the exhaust system. These methods are used in active filter systems and include a general cycle consisting of a sustained particulate accumulation time followed by a short high temperature regeneration period. While often successful, many of the methods have been shown to have adverse effects on either the diesel particulate filter or the operation of an engine in a vehicle including the diesel particulate filter. Specifically, these methods may result in filter cracking and destruction due to thermal gradients, increased fuel consumption, lower oxygen concentration in the diesel exhaust, and higher intrinsic particulate or hydrocarbon emissions in the diesel exhaust.

In light of the above, there exists a need for an energy efficient regenerating particulate filter.

SUMMARY

An exhaust gas filter apparatus includes a particulate filter for collecting a particulate from an exhaust gas. The exhaust gas filter also includes a electromagnetic radiation resonator to heat an absorber to ignite the particulate and regenerate the particulate filter. Heating the absorber creates a high peak temperature that locally ignites the particulate and allows for further particulate removal as the combustion process propagates through the particulate filter. In various embodiments, the absorber may be composed of a magnetic material. In some embodiments, the peak temperature of the absorber is limited by the Curie temperature of the magnetic material. Consequently, thermal runaway and hot spots may be inhibited in the particulate filter.

In one embodiment, the exhaust gas filter apparatus enables the regeneration process by reducing parasitic radiation absorption in the particulate, so as to achieve particulate combustion with a minimum amount of electromagnetic radiation. The reduction of parasitic radiation absorption is achieved with a reflector in the particulate filter that acts as an electromagnetic barrier at the electromagnetic radiation frequency. The reflector inhibits the propagation of electromagnetic radiation to the particulate filter region in which the bulk of the particulate is located.

An apparatus, in accordance with one embodiment includes a filter portion, a reflector, and an absorber. The filter portion is configured to collect a particulate. The reflector is configured to inhibit electromagnetic radiation from propagating through the filter portion. The absorber is configured to heat to a temperature sufficient to ignite the particulate in response to the electromagnetic radiation.

An exhaust gas filter in accordance with one embodiment includes a particulate filter. The particulate filter includes an absorber configured to collect a particulate from an exhaust gas. The exhaust gas filter also includes an electromagnetic radiation resonator. The resonator extends partially into the particulate filter and is configured to heat the absorber to a temperature sufficient to ignite the particulate in the particulate filter.

A method of regenerating a particulate filter in accordance with one embodiment of the present invention includes filtering a particulate from an exhaust gas in the particulate filter. The method further includes generating a resonant radiation in an ignition portion of the particulate filter so as to be capable of heating a portion of the particulate to an ignition temperature.

A method of manufacturing a particulate filter, in accordance with one embodiment, includes depositing a reflective coating, for example a microwave reflective coating, over a surface of a filter portion and depositing an absorptive coating adjacent the reflective coating. The absorptive coating may be capable of absorbing a magnetic field component of electromagnetic radiation. In another embodiment, an electric field absorptive coating is deposited over a portion of the particulate filter.

A method of manufacturing a particulate filter, in accordance with one embodiment, includes depositing an absorptive coating over a surface of a first filter portion and depositing a reflective coating, for example a microwave reflective coating, over a surface of a second filter portion. The absorptive coating is capable of absorbing an electric field component of electromagnetic radiation. The method further includes mounting the first filter portion to the second filter portion with the reflective coating located between the first filter portion and the second filter portion.

A method of manufacturing a particulate filter, in accordance with one embodiment, includes depositing an absorptive coating on a first surface of a first filter portion and depositing a reflective coating, for example a microwave reflective coating, on a second surface of the first filter portion. The absorptive coating is capable of absorbing an electric field component of electromagnetic radiation. The method further includes mounting the first filter portion to a second filter portion with the reflective coating located between the first filter portion and the second filter portion and the second surface opposing the first surface.

BRIEF DESCRIPTION OF THE DRAWINGS

The features and advantages of the present invention will be better understood with regard to the following description, appended claims, and accompanying drawings where:

DESCRIPTION

Various approaches have been taken in known methods of regenerating diesel particulate filters using microwave heating. In a first approach, a diesel particulate captured in the diesel particulate filter absorbs microwave radiation to generate the required heat in a two-step regeneration process. In the first step, the diesel particulate is heated by the microwave radiation in the absence of an exhaust gas flowing through the diesel particulate filter. In the second step, air is introduced into the diesel particulate filter to oxidize the diesel particulate, which results in rapid oxidation of the diesel particulate. Such rapid oxidation often results in damage to the filter substrate, which may include melting or cracking of the substrate due to extreme thermal gradients.

In addition to potential filter damage, this approach requires considerable energy to raise the temperature of the diesel particulate to an ignition temperature. Because the diesel particulate is in intimate contact with channel walls of the diesel particulate filter and distributed through the diesel particulate filter, the diesel particulate filter and the diesel particulate must absorb sufficient microwave radiation sufficient to bring the diesel particulate to the ignition temperature. Consequently, this approach is inefficient in contrast to the other known approaches of microwave heating.

In a second approach, the diesel particulate filter is fabricated from a microwave absorbing material, such as silicon carbide. The diesel particulate filter, however, must absorb sufficient radiation to bring the diesel particulate to the ignition temperature. Thus, this method suffers from the same inefficiency of the first approach.

In a third approach, only a small selected region of the diesel particulate filter is heated to the ignition temperature of the diesel particulate. The selected region of the diesel particulate filter is fabricated with, or coated with, a material that highly absorbs microwave radiation. Thus, the selected region absorbs microwave radiation creating a localized heating area that ignites the diesel particulate and results in combustion propagation through the remaining diesel particulate. The efficiency and size of the diesel particulate filter, however, is limited because of parasitic absorption of the microwave radiation by the diesel particulate. Moreover, a thermal mismatch between the microwave absorbing material and the substrate of the diesel particulate filter may result in cracking of the diesel particulate filter during regeneration.

Figure 1A:
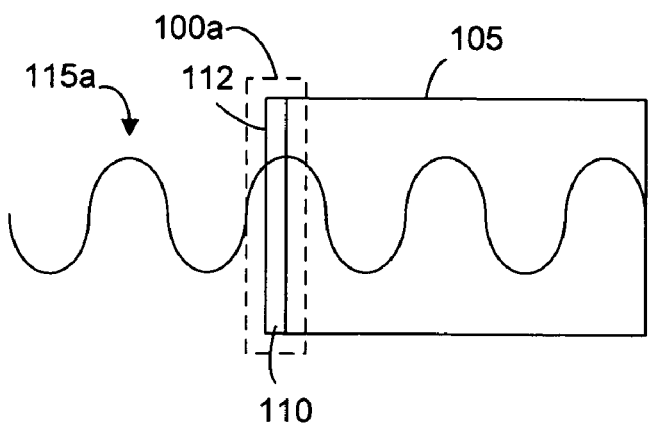
FIG. 1A is a block diagram of a clean diesel particulate filter.

FIG. 1A illustrates propagation of resonant microwave radiation in a microwave frequency resonator 115a located in a clean diesel particulate filter 105. The diesel particulate filter 105 has an absorber 110 on an intake surface 112. The absorber 110 is capable of absorbing microwave radiation in the microware frequency resonator 115a. The diesel particulate filter 105 is made of a material that does not absorb microwave radiation, such as cordierite. Because of the magnetic properties of the absorber 110, an absorbing region 10a of the diesel particulate filter absorbs a magnetic field component (H) of the microwave radiation in the microwave frequency resonator 115a and produces heat. After a time period at a microwave power level, the temperature of the absorbing region 100a reaches an ignition temperature of the diesel particulate.

Figure 1B:
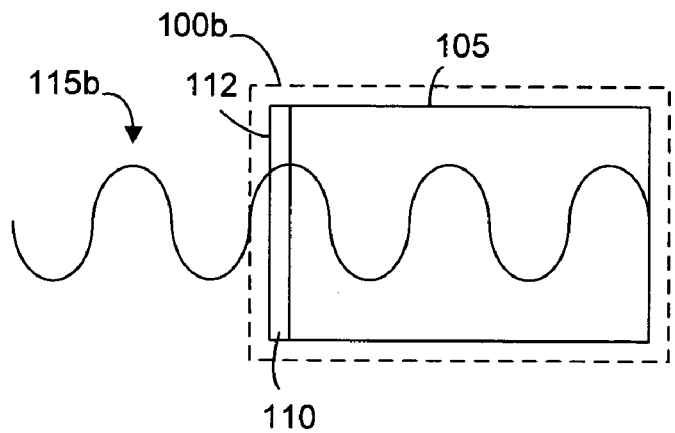
FIG. 1B is a block diagram of the diesel particulate filter containing a diesel particulate.

FIG. 1B illustrates the diesel particulate filter 105, which is now loaded with diesel particulate, e.g., soot (not shown). Because the diesel particulate is electrically conductive in nature, the diesel particulate absorbs an electrical field component (E) of microwave radiation in a microwave frequency resonator 115b. As a result, the entire diesel particulate filter 105 becomes an absorption region 100b that absorbs the microwave radiation 115b. Consequently, the microwave power density in the absorber 110 is diminished, which may reduce the temperature of the absorber 110 to well below the ignition temperature of the diesel particulate.

Figure 1C:
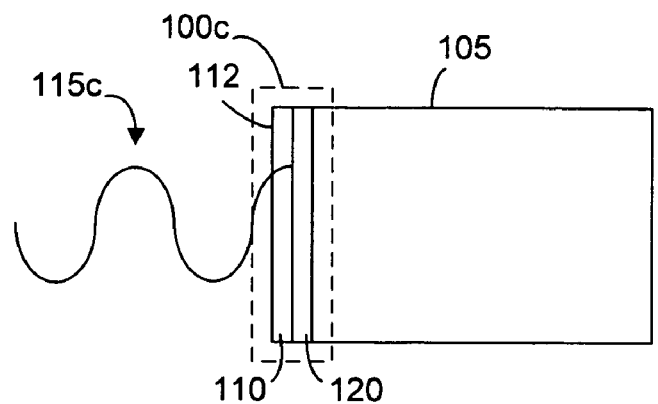
FIG. 1C is a block diagram of the diesel particulate filter and a microwave frequency resonator, in accordance with one embodiment of the present invention.

FIG. 1C illustrates how a microwave frequency resonator 115c alleviates parasitic microwave absorption in the diesel particulate to restore the initial condition shown in FIG. 1A, in which the absorber 110 is the primary absorber of microwave radiation in the microwave frequency resonator 115c. As shown in FIG. 1C, a reflector 120 is deposited on the intake surface 112 of the diesel particulate filter 105 between the absorber 110 and the particulate filter 105. The reflector 120 inhibits the microwave radiation from propagating along the entire length of the diesel particulate filter 105. As a result, a microwave absorption region 100c is primarily limited to the absorber 110, resulting in efficient heating of the diesel particulate to the ignition temperature.

Figure 2:
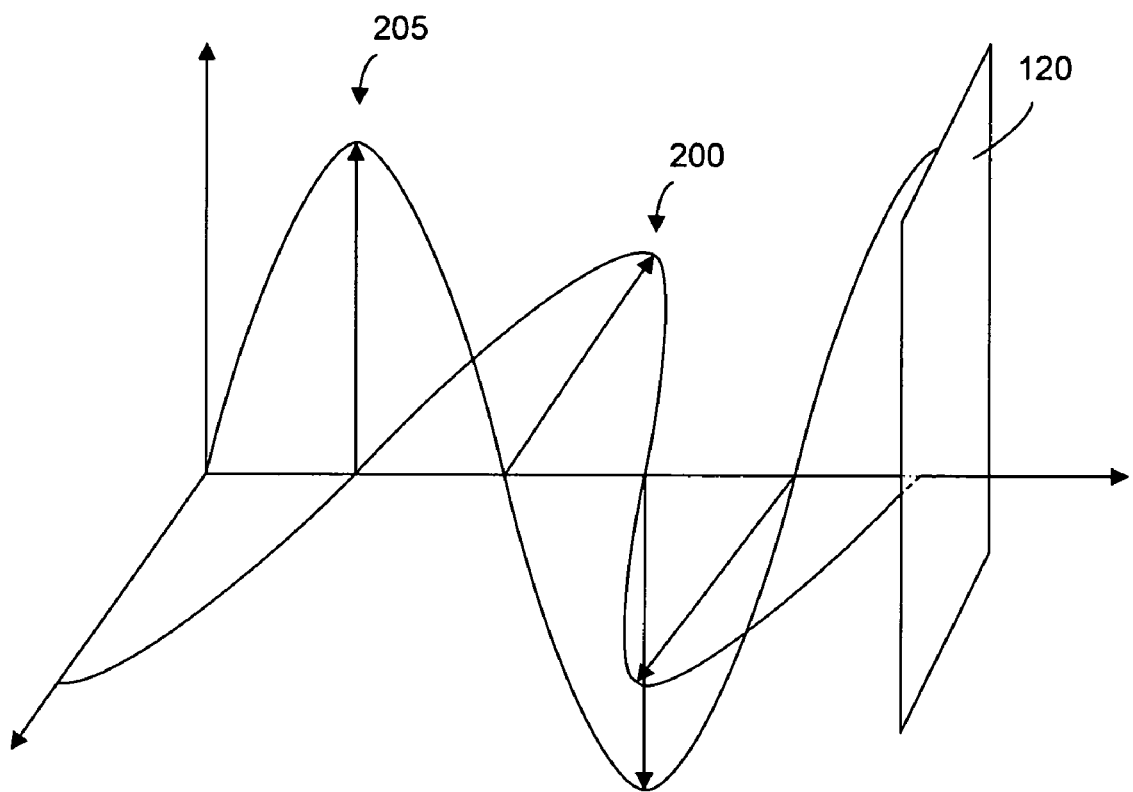
FIG. 2 is a schematic diagram of microwave radiation showing the relationship between electric and magnetic field components in a resonant cavity.

FIG. 2 illustrates an electric field component (E) 200 and a magnetic field component (H) 205 of microwave radiation in the microwave frequency resonator 115c of FIG. 1C. The electric field component 200 and the magnetic field component 205 are out of phase by a quarter of a wavelength. Consequently, the electric field component 200 has zero amplitude when the magnetic field component 205 has maximum amplitude, and the electric field component 200 has maximum amplitude when the magnetic field component 205 has zero amplitude. As shown in FIG. 2, the electric field component 200 is at a minimum and the magnetic field component 205 is at a maximum at the reflector 120.

To achieve absorption and heating in the absorber 110 of FIG. 1C, the absorber 110 is located such that either the electric field or the magnetic field is not at a minima. In one embodiment, the amplitude of the magnetic field component has maximum amplitude at the absorber 110 such that the absorber 110 efficiently absorbs the magnetic field component. In an alternative embodiment, discussed below with reference to FIGS. 4 and 6, in which the absorber 110 absorbs the electrical field component, the electrical field component has maximum amplitude at the absorber 110.

Figure 3:
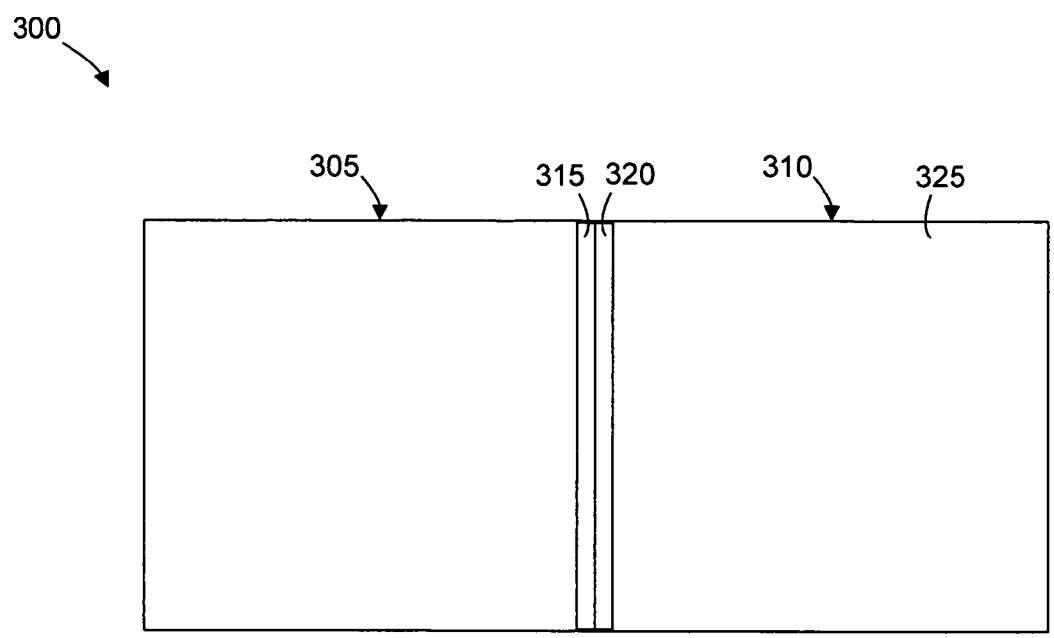
FIG. 3 is a block diagram of an exhaust gas filter, in accordance with another embodiment of the present invention.

FIG. 3 illustrates a block diagram of an embodiment of an exhaust gas filter apparatus 300. The exhaust gas filter apparatus 300 includes a microwave frequency resonator 305 and a particular filter 310. The particulate filter 310 includes a filter portion 325 for collecting a particulate (not shown) from a gas stream such as an exhaust gas. The particulate filter 310 also includes a reflector 320 adjacent to the filter portion 325 and an absorber 315 adjacent to the reflector 320. As shown in FIG. 3, the reflector 320 is between the absorber 315 and the filter portion 325. In this embodiment, the reflector 320 is composed of a material capable of reflecting microwave radiation. The absorber 315 is composed of a magnetic material capable of absorbing a magnetic field component of microwave radiation and increasing in temperature in response to the absorption of the magnetic field component.

The microwave frequency resonator 305 is adjacent to the particulate filter 310 and extends to the reflector 320. The microwave frequency resonator 305 encloses the absorber 315 but does enclose the filter portion 325.

In operation, the microwave frequency resonator 305 is stimulated by a microwave source (not shown) to establish a resonant microwave frequency in the microwave frequency resonator 305. The absorber 315 absorbs the microwave radiation and heats to an ignition temperature of the particulate. Particulate in, or adjacent to, the absorber 315 then ignites, lighting off the remaining particulate downstream in the particulate filter 310. Thus, all of the particulate in the particulate filter 310 combusts in a flashing process. In this way, the particulate filter 310 is regenerated.

Figure 4:
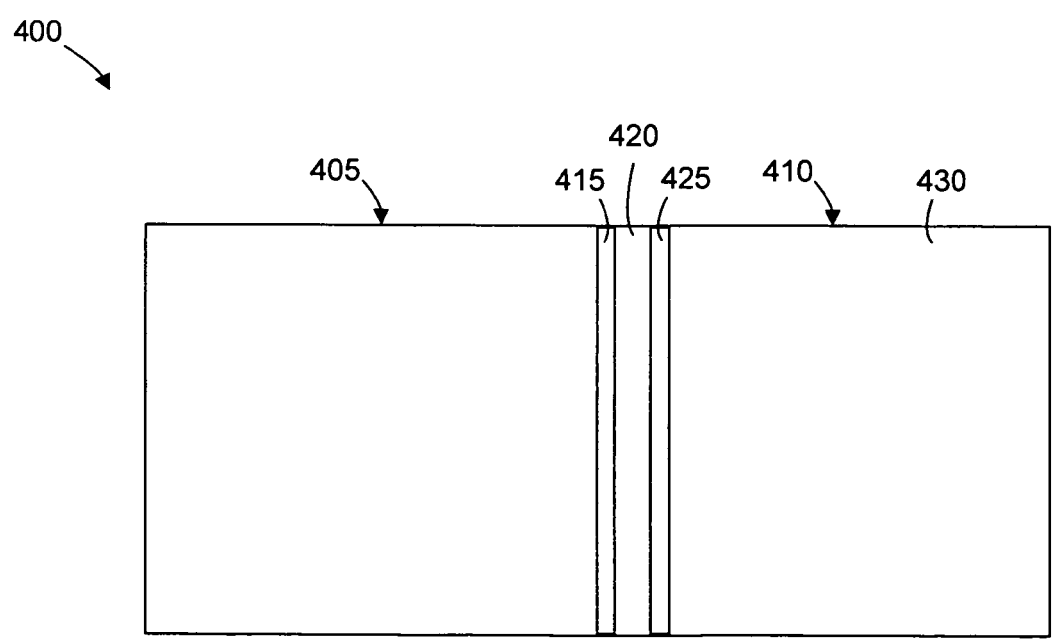
FIG. 4 is a block diagram of an exhaust gas filter, in accordance with another embodiment of the present invention.

FIG. 4 illustrates a block diagram of an exhaust gas filter apparatus 400, in accordance with another embodiment of the present invention. The exhaust gas filter apparatus 400 includes a microwave frequency resonator 405 and a particular filter 410. The particulate filter 410 includes a reflector 425 between a filter portion 420 and a filter portion 430, and an absorber 415 adjacent to the filter portion 420. The reflector 425 is composed of a material capable of reflecting microwave radiation. The absorber 415 is composed of a material capable of absorbing an electric field component of microwave radiation and increasing in temperature in response to the electric field component.

The microwave frequency resonator 405 is adjacent the particulate filter 410 and extends to the reflector 425. The microwave frequency resonator 405 encloses the absorber 415 and the filter portion 420 but does enclose the filter portion 430.

In operation, the microwave frequency resonator 405 is stimulated by a microwave source (not shown) to establish a resonant microwave frequency in the microwave frequency resonator 405. The absorber 415 absorbs an electric field component of the microwave radiation and heats to an ignition temperature of the particulate (not shown). Particulate in, or adjacent to, the absorber 415 then ignites, lighting off the remaining particulate downstream in the particulate filter 410. Thus, substantially all of the particulate in the particulate filter 410 combusts in a flashing process. In this way, the particulate filter 410 is regenerated.

Figure 5:
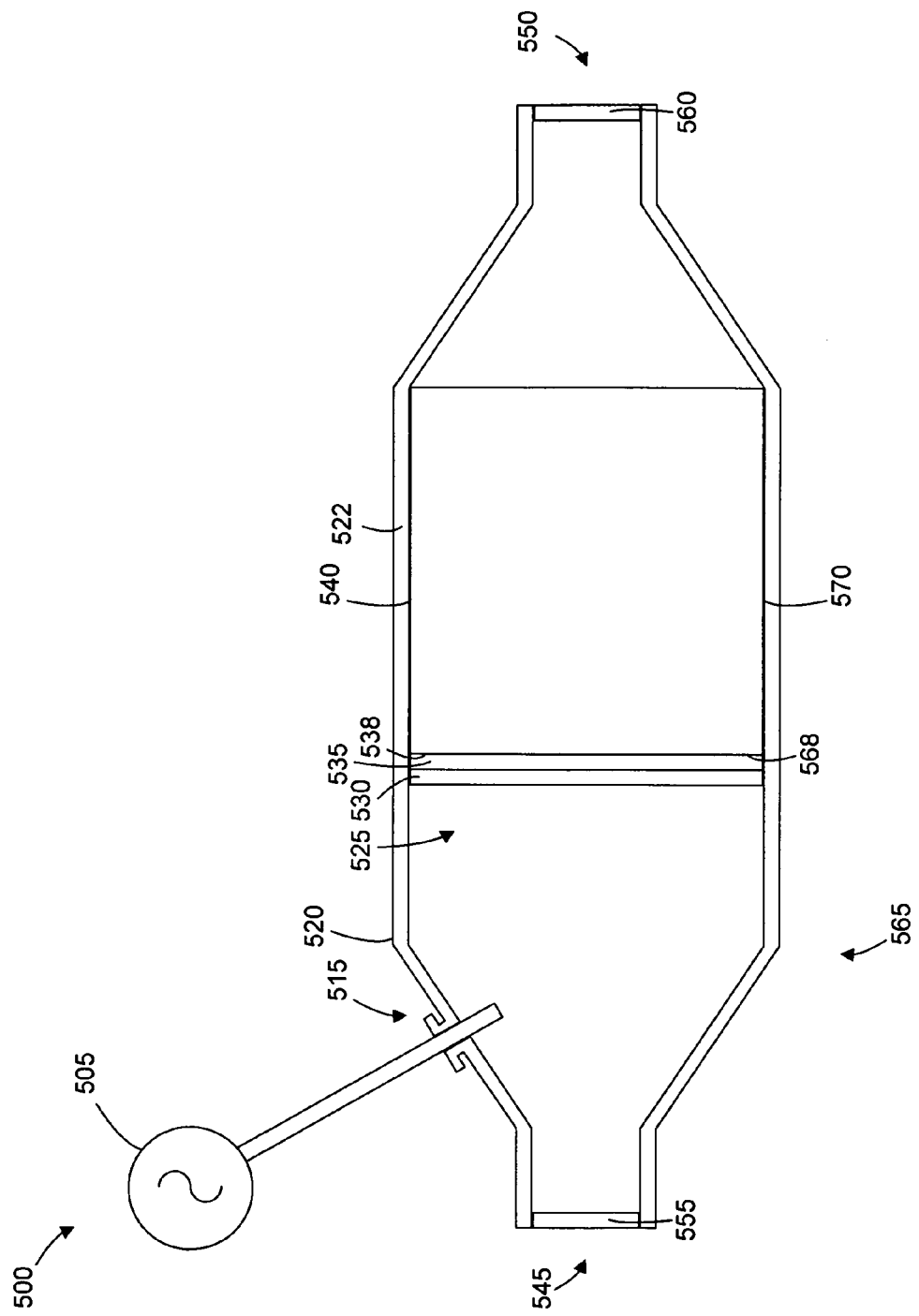
FIG. 5 is a cross-sectional view of an exhaust gas filter apparatus, in accordance with one embodiment of the present invention.

FIG. 5 illustrates an exhaust gas filter apparatus 500 in accordance with one embodiment of the present invention. The exhaust gas filter apparatus 500 includes an enclosure 520 surrounding a cavity 525. The enclosure 520 has an exhaust gas intake aperture 545 at one end and an exhaust gas outlet aperture 550 at an opposing end. The enclosure 520 may be a metal casing having a substantially cylindrical shape extending between the exhaust gas intake aperture 545 and the exhaust gas outlet aperture 550. As shown in FIG. 5, the enclosure 520 may have a diameter that tapers in a direction toward each of the exhaust gas intake aperture 545 and the exhaust gas outlet aperture 550. The walls of the enclosure 520 should be capable of reflecting microwave radiation back into the cavity 525 such that cavity 525 forms a microwave cavity in the enclosure 520.

The exhaust gas filter 500 includes a radio frequency choke 555 in the exhaust gas intake aperture 545 that allows an exhaust gas to flow into the cavity 525 of the enclosure 520, and an optional radio frequency choke 560 that allows the exhaust gas to flow out of the enclosure 520. Although the radio frequency chokes 555 and 560 allow the exhaust gas to flow through the enclosure 520, the radio frequency chokes 555 and 560 are capable of reflecting microwaves back into the cavity 525. In this way, the radio frequency chokes 555 and 560 contain the microwaves in the cavity 525.

In the particular embodiment of FIG. 5, the exhaust gas filter apparatus 500 includes a radio frequency port 515. The radio frequency port 515 is an opening into the cavity 525 of the enclosure 520 for allowing microwave radiation into the cavity 525. A microwave source 505 may generate the microwave radiation and introduce the microwave radiation into the cavity 525 via the radio frequency port 515. Other embodiments may include more than one microwave source 505, more than one radio frequency port 515, or ports in other locations/configurations. Other means of introducing microwave radiation into the enclosure 520 are possible.

The exhaust gas filter apparatus 500 includes a particulate filter 540 in the cavity 525 abutting a sidewall 522 of the enclosure 520. The sidewall 522 may be cylindrically shaped, and the particulate filter 540 may be a diesel particulate filter. Although some of the exhaust gas may flow through between the particulate filter 540 and the enclosure 520, the exhaust gas substantially flows through the particulate filter 540. The particulate filter 520 includes a filter portion 570 for collecting a particulate from the exhaust gas flowing through the enclosure 520. The filter portion 570 may be a porous ceramic filter, such as cordierite, which is capable of collecting soot particulates from a diesel exhaust gas. The filter portion 570 may be formed with a malleable ceramic material in an extrusion process.

The particulate filter 540 includes a reflector 535 at an intake end 538 of the filter portion 570, which is located closer to the exhaust gas intake aperture 545 than to the exhaust gas outlet aperture 550. The reflector 535 functions as an electromagnetic barrier that inhibits microwave radiation from passing into the filter portion 570. Although the reflector 535 allows the exhaust gas to flow into the filter portion 570, the reflector 535 is capable of reflecting microwave radiation back into the cavity 525. In turn, the radio frequency choke 555 and the enclosure 520 are capable of reflecting microwave radiation toward the reflector 535.

The reflector 535 may be a metal screen mounted to the filter portion 570 or a layer of a metallic material deposited on an intake end 538 of the filter portion 570. For example, a metallic material may be deposited on the intake end 538 of the filter portion 570 with a chemical vapor deposition process, or with another thin film deposition process. The reflector 535 may be composed of a microwave reflective material held in a binder, such as, for example, a layer of metallic paint that is deposited on the intake end 538 of the filter portion 570 such that the intake end 538 remains porous. For example, the metallic paint may be deposited on an exterior surface of the intake end 538 of the filter portion 570 in a grid pattern, or the metallic paint may be deposited on the in take end 538 so as to impregnate into the filter portion 570 such that the exhaust gas may flow through the filter portion 570. The metallic paint, or other binder, may be deposited on the filter portion 570 by dipping the filter portion 570 into the metallic paint, or other binder. The reflector 535 also may be formed by aqueous deposition techniques, or the like. The reflector 535 may be composed of a metal such as silver, copper, gold, chromium, platinum, iridium, osmium, rhodium, other precious or platinum group metals, or other transition metals.

The radio frequency choke 555 and the reflector 535 are spaced apart by a distance such that the radio frequency choke 555 together with the reflector 535 form a microwave frequency resonator 565 in the cavity 525. For example, the radio frequency choke 555 and the reflector 535 may be spaced apart by a distance that is an integral multiple of one-half a wavelength of the frequency of microwave radiation generated by the microwave source 505. A spacer (not shown) may be inserted into the cavity 525 to establish an intra-cavity resonator length at an integral number of appropriate wavelengths. Thus, the microwave source 505 introduces microwave radiation into the cavity 525, and the radio frequency choke 555 and the reflector 535 establish a resonant microwave frequency in the cavity 525 between the radio frequency choke 555 and the reflector 535.

The particulate filter 540 includes an absorber 530 between the radio frequency choke 555 and the reflector 535, within the microwave frequency resonator 565. The absorber 530 is composed of a magnetic material capable of absorbing a magnetic field component of the microwave radiation and increasing in temperature in response to the magnetic field component. The absorber 530 may be composed of a nonmetallic magnetic material. For example, the absorber 530 may be composed of a ferrite material, such as $Fe_3O_4$. Alternatively, the absorber 530 may be composed of metallic magnetic particles, or of nonmetallic magnetic particles dispersed in a binder, such as paint. The binder may be a magnetic or a nonmagnetic material that is not chemically reactive with the magnetic particles disbursed therein.

The Curie temperature of the absorber 530 should be higher than an ignition temperature of the particulate. In this way, the absorber 530 may absorb microwave radiation at least until the temperature of the absorber 530 reaches an ignition temperature of the particulate. For example, the absorber 530 may be a ferrite material having a Curie temperature above 500 degrees centigrade, or a lithium based ferrite material having a Curie temperature of about 670 degrees centigrade. Other possible materials for the absorber 530 include samarium cobalt or iron.

The absorber 530 may be positioned adjacent the reflector 535 such that the magnetic field component of the resonant microwave radiation in the microwave frequency resonator 565 has a peak amplitude in the absorber 530. The absorber 530 absorbs a substantial portion of a magnetic field component of the resonant microwave radiation in the cavity 525 such that the absorber 530 heats to an ignition temperature of the particulate.

The absorber 530 may be an absorptive coating on the reflector 535. The absorptive coating may be deposited on the reflector 535 with a deposition process, such as by chemical vapor deposition, or by painting the particulate filter 540 with an absorptive material.

As a result of the ignition of the particulate in or near the absorber 530, the downstream particulate in the remaining portion of the particulate filter 540 combusts in a flashing process. The ignition and combustion of the particulate leaves a residue in the particulate filter 540 which flows out of the cavity 525 through the exhaust gas outlet aperture 550 along with the exhaust gas. In this way, the particulate filter 540 is regenerated.

The microwave source 505 may generate the microwave radiation periodically, or in response to a sensing signal or a control signal indicating that the particulate filter 540 is saturated with particulate. In this way, the energy required to regenerate the particulate filter 540 can be minimized to increase the efficiency of the exhaust gas filter apparatus 500. Although only one microwave source 505 and only one radio frequency port 515 are shown in FIG. 5, two or more microwave sources 505 may generate the microwave radiation and introduce the microwave radiation into the cavity 525 via one or more radio frequency ports 515.

Figure 6:
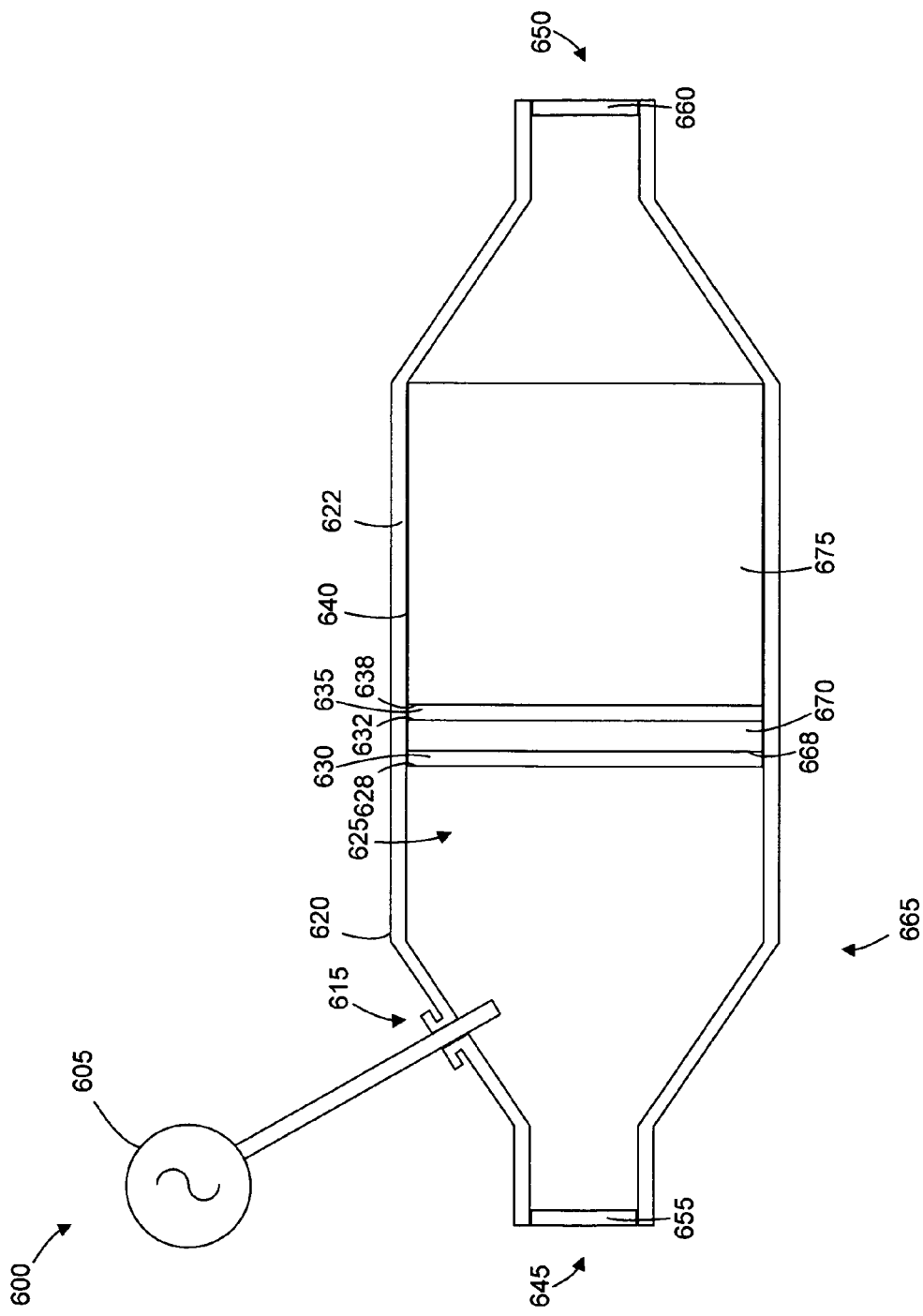
FIG. 6 is a cross-sectional view of an exhaust gas filter apparatus, in accordance with another embodiment of the present invention.

FIG. 6 illustrates an exhaust gas filter apparatus 600 in accordance with another embodiment of the present invention. The exhaust gas filter apparatus 600 includes an enclosure 620 surrounding a cavity 625. The enclosure 620 has an exhaust gas intake aperture 645 at one end and an exhaust gas outlet aperture 650 at another end.

The exhaust gas filter 600 includes a radio frequency choke 655 in the exhaust gas intake aperture 645 that allows an exhaust gas to flow into the cavity 625 of the enclosure 620 and is capable of reflecting microwave radiation back into the cavity 625 to contain the microwave radiation in the cavity 625. The exhaust gas filter 600 also includes an optional radio frequency choke 660 that allows the exhaust gas to flow from the inside of the enclosure 620 to the outside of the enclosure 620, and which is capable of reflecting microwave radiation back into in the cavity 625 to contain the microwave radiation in the cavity 625.

In the embodiment of FIG. 6, the exhaust gas filter 600 includes a radio frequency port 615. The radio frequency port 615 is an opening into the cavity 625 of the enclosure 620 for allowing microwave radiation into the cavity 625. A microwave source 605 may generate the microwave radiation and introduce the microwave radiation into the cavity 625 via the radio frequency port 615. Other embodiments may include more than one radio frequency port 615, or ports in other configurations/locations. Other means of introducing microwave radiation into the enclosure 620 are possible.

The exhaust gas filter apparatus 600 includes a particulate filter 640 in the cavity 625 abutting a sidewall 622 of the enclosure 620. The particulate filter 640 includes a filter portion 670 between an absorber 630 and a reflector 635, and a main filter portion 675 for collecting a particulate from the exhaust gas flowing through the enclosure 620. Each of the filter portion 670 and the main filter portion 675 may be a portion of a single porous ceramic filter, or each of the filter portion 670 and the main filter portion 675 may be separate porous ceramic filters. In one embodiment, the volume of the filter portion 670 is less than the volume of the main filter portion 675. The thickness of the filter portion 670 may be selected such that the microwave radiation has a maximum electric field component at or near the absorber 630. For example, the filter portion 670 may have a thickness of 1-2 centimeters.

In this embodiment, the reflector 635 is between the filter portion 670 and the main filter portion 675. The reflector 635 functions as an electromagnetic barrier that inhibits microwave radiation from passing into the main filter portion 675. Although the reflector 635 allows the exhaust gas to flow into the main filter portion 675, the reflector 635 is capable of reflecting microwave radiation back toward the cavity 625. The radio frequency choke 655 and the enclosure 620 are capable of reflecting microwave radiation back toward the reflector 635. The reflector 635 is positioned within the cavity 625 such that a microwave frequency resonator 665 is formed in the cavity 625.

The reflector 635 may be metal screen mounted to the filter portion 670 or the main filter portion 675. For example, the reflector 635 may be a screen or a layer made of copper or gold. Alternatively, the reflector 635 may be a layer of a metallic material deposited on a back surface 632 of the filter portion 670 or an intake surface 638 of the main filter portion 675, or both. For example, a metallic material may be deposited on the back surface 632 of the filter portion 670 of the intake surface 638 of the main filter portion 675 in a chemical vapor deposition process, or another deposition process.

In this embodiment, the absorber 630 is adjacent the filter portion 670 in the microwave frequency resonator 665. The absorber 630 is composed of a material capable of absorbing an electric field component of the microwave radiation and increasing in temperature in response to the electric field component. For example, the absorber 630 may be composed of silicon carbide, indium tin oxide, ferroelectric materials, or other materials with a high electric field loss tangent, or other electric field absorbing materials.

The absorber 630 may be an absorptive coating on the intake end 668 of the filter portion 670. The absorptive coating may be deposited on an intake surface 628 of the filter portion 670 in a chemical vapor deposition process, or another deposition process. Alternatively, the absorptive coating may be a binder, such as an absorptive paint, deposited on the intake surface 628 of the filter portion 670. After forming the reflector 635, the filter portion 670 is mounted to the main filter portion 675, with the reflector 635 between the filter portion 670 and the main filter portion 675. For example, the filter portion 670 may be mounted to the main filter portion 675 in a thermal consolidation process, which may be performed before or after forming the absorber 630.

The absorber 630 is spaced apart from the reflector 635 such that the electric field component of the resonant microwave radiation in the microwave frequency resonator 665 has a peak amplitude at the absorber 630. The absorber 630 may be spaced apart from the reflector 635 by an integral multiple of a quarter wavelength of the microwave radiation generated by the microwave source 605. For example, the absorber 630 may be spaced apart from the reflector 635 by a quarter wavelength (e.g., 1-2 centimeters) of the microwave radiation generated by the microwave source 605.

The absorber 630 absorbs a sufficient portion of the electrical field component of the resonant microwave radiation in the cavity 625 such that the absorber 630 increases to an ignition temperature of the particulate in the absorber 630 or the filter portion 670 of the particulate filter 640. As a result of the ignition of the particulate in the absorber 630, or in the filter portion 670, the particulate in the main filter portion 675 also combusts in a flashing process. The ignition and combustion of the particulate leaves a residue in the particulate filter 640 which flows from the cavity 625 through the exhaust gas outlet aperture 650 along with the exhaust gas. In this way, the particulate filter 640 is regenerated.

Figure 7A:
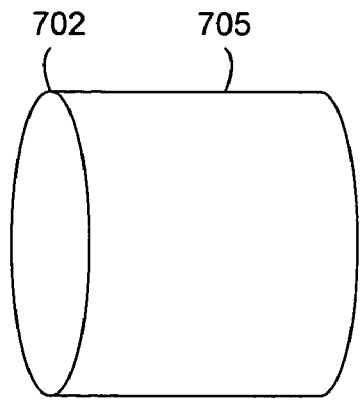
FIGS. 7A-C are perspective views of a particulate filter illustrating a method of manufacturing the particulate filter, in accordance with one embodiment of the present invention.
Figure 7B:
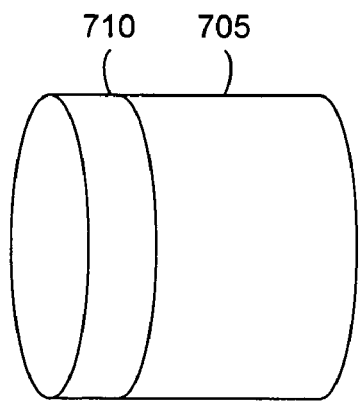
Figure 7C:
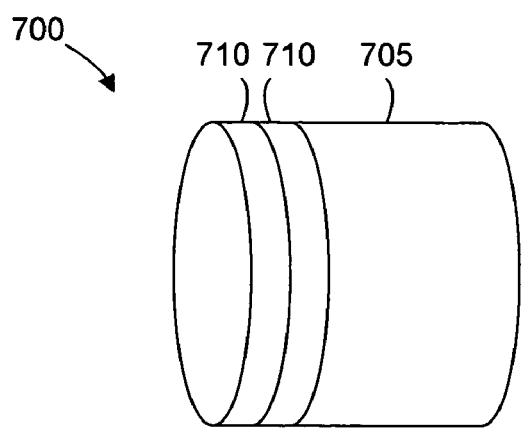

FIGS. 7A-C illustrate a method of manufacturing a particulate filter 700, in accordance with one embodiment of the present invention. FIG. 7A illustrates a filter portion 705 of the particulate filter 700 (FIG. 7C). The filter portion 705 functions to collect a particulate from an exhaust gas. In one embodiment, the filter portion 705 is composed of a porous ceramic and is made by an extrusion process.

As shown in FIG. 7B, a microwave reflective coating 710 is deposited on an intake end 702 of the filter portion 705. The microwave reflective coating 710 may be deposited on the intake end 702 of the filter portion 705 by dipping the filter portion 705 into a metallic paint. In another embodiment, the microwave reflective coating 710 may be a metal deposited on an intake surface of the filter portion 705 in a chemical vapor deposition process, or another thin film deposition process.

As shown in FIG. 7C, an absorptive coating 715 is deposited adjacent the microwave reflective coating 710. The absorptive coating 715 may be deposited over a portion of the microwave reflective coating 710. The absorptive coating 715 may be a magnetic field absorbing material. The absorptive coating 715 may be deposited on the microwave reflective coating 710 by dipping the filter portion 705 into a magnetic field absorptive paint or other binder. In another embodiment, the absorptive coating 715 may be deposited on the microwave reflective coating 710 in a chemical vapor deposition process or another thin film deposition process.

Figure 8A:
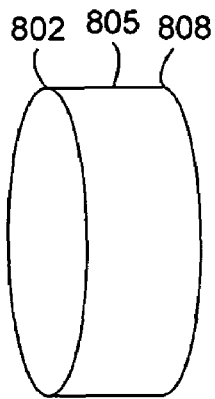
FIGS. 8A-D are perspective views of a particulate filter illustrating a method of manufacturing the particulate filter, in accordance with one embodiment of the present invention.
Figure 8B:
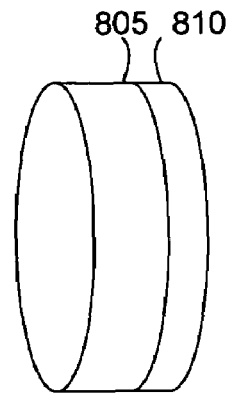

FIGS. 8A-B illustrate a method of manufacturing a particulate filter 800, in accordance with one implementation of the present invention. FIG. 8A illustrates a filter portion 805 of the particulate filter 800 (FIG. 8D). The filter portion 805 functions to collect a particulate from an exhaust gas. The filter portion 805 may be composed of a porous ceramic material formed in an extrusion process.

As shown in FIG. 8B, a microwave reflective coating 810 is deposited on an outlet end 808 of the filter portion 805. The microwave reflective coating 810 may be deposited on the outlet end 808 of the filter portion 805 by dipping the filter portion 805 into a metallic paint or other binder. In one embodiment, the microwave reflective coating 810 is a metal deposited on an intake surface of the filter portion 805 in a chemical vapor deposition process, or another thin film deposition process.

Figure 8C:
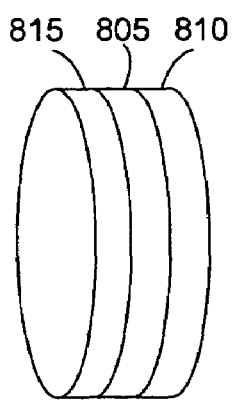
Figure 8D:
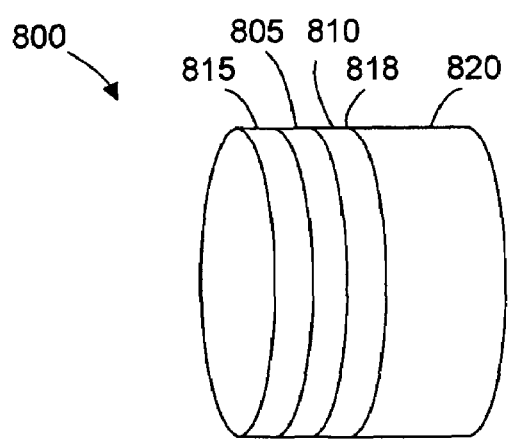

As shown in FIG. 8C, an absorptive coating 815 is deposited on an intake end 802 of the filter portion 805 that opposes the outlet end 808 of the filter portion 805. The absorptive coating 815 may be deposited on the intake end 802 of the filter portion 805 by dipping the filter portion 805 into an electric field absorptive paint or other binder. In one embodiment, the absorptive coating 815 is an electric field absorbing material deposited on the intake end 802 of the filter portion 805 in a chemical vapor deposition process, or another thin film deposition process.

As shown in FIG. 8D, a filter portion 820 is mounted to the filter portion 805 at the microwave reflective coating 810. The filter portion 820 functions to collect a particulate from the exhaust gas. The filter portion 820 may be composed of a porous ceramic material formed in an extrusion process as discussed hereinabove. The filter portion 820 may be mounted to the filter portion 805 at the microwave reflective coating 810 in a thermal consolidation process. In an alternative embodiment, the reflecting coating 810 is deposited on an intake end 818 of the filter portion 820 instead of the outlet end 808 of the filter portion 805.

Although some of the above embodiments are discussed with reference to microwaves or microwave electromagnetic radiation, it is not limited strictly to microwave frequencies. Thus, some embodiments are not limited to electromagnetic radiation in the range of about 300 MHz to about 300 GHz. Embodiments my utilized other frequencies of propagating electromagnetic energy, and materials that reflect and/or absorb other frequencies of electromagnetic energy, to resonate other frequencies of electromagnetic energy, if desired. Furthermore, although the above is discussed with reference to a radio frequency choke or RF choke, radio frequency choke or RF choke is a general term as used herein for a device capable of inhibiting passage of propagating electromagnetic radiation, for example microwaves or other electromagnetic frequencies.

The embodiments described herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is to be understood that the present invention is not limited to only the embodiments illustrated.

What is claimed is:

1. A particulate filter apparatus comprising:
   a) a first filter portion configured to collect a particulate;
   b) a reflector configured to inhibit electromagnetic radiation from propagating through the first filter portion;
   c) an absorber configured to heat to a temperature sufficient to ignite the particulate in response to the electromagnetic radiation; and
   d) a second filter portion between the reflector and the absorber.

2. The particulate filter apparatus of claim 1, wherein the reflector is adjacent to the first and second filter portions.

3. The particulate filter apparatus of claim 2, wherein the absorber is adjacent to the second filter portion reflector.

4. The particulate filter apparatus of claim 1, wherein the first filter portion and the second filter portion form a unitary filter, and wherein the unitary filter comprises the reflector.

5. The particulate filter apparatus of claim 4, wherein the absorber is adjacent to the second filter portion.

6. The particulate filter apparatus of claim 1, further comprising an electromagnetic resonant cavity adjacent the second filter portion, wherein the reflector partially defines the electromagnetic resonant cavity, the absorber and the second filter portion being located within the electromagnetic resonant cavity.

7. The particulate filter apparatus of claim 1, wherein the reflector is configured to inhibit microwave radiation from propagating through the first filter portion, and wherein the absorber is configured to heat to a temperature sufficient to ignite the particulate in response to the microwave radiation.

8. The particulate filter apparatus of claim 7 further comprising a microwave resonant cavity adjacent the first filter portion, wherein the reflector partially defines the microwave resonant cavity, the absorber being located within the microwave resonant cavity.

9. A particulate filter apparatus comprising:
   a) a particulate filter comprising an absorber and a reflector both near an RF source end of the particulate filter, the absorber being spaced apart from the reflector of the particulate filter; and
   b) an electromagnetic radiation resonator at the end, the electromagnetic radiation resonator extending to the reflector such that the absorber is in the electromagnetic radiation resonator.

10. The particulate filter apparatus of claim 9, wherein the absorber is separated from the reflector by a distance approximately equal to an integer multiple of one-quarter of the wavelength of electromagnetic radiation in the electromagnetic radiation resonator.

11. The particulate filter apparatus of claim 9, wherein the absorber is capable of absorbing a magnetic field component of an electromagnetic radiation.

12. The particulate filter apparatus of claim 11, wherein the electromagnetic radiation resonator comprises a RF choke opposing the reflector.

13. The particulate filter apparatus of claim 12, wherein the absorber is composed of a ferrite material.

14. The particulate filter apparatus of claim 12, wherein the absorber comprises a nonmetallic magnetic material disbursed in a binder.

15. The particulate filter apparatus of claim 12, wherein the absorber comprises a metallic magnetic material disbursed in a binder.

16. The particulate filter apparatus of claim 9, wherein the absorber is capable of absorbing an electric field portion of an electromagnetic radiation.

17. The particulate filter apparatus of claim 16, wherein the particulate filter comprises a first filter portion and a second filter portion, the first filter portion located in the electromagnetic radiation resonator, and wherein the volume of the first filter portion is less than the volume of the second filter portion.

18. The particulate filter apparatus of claim 9, wherein the electromagnetic radiation resonator comprises a RF choke opposing the reflector, and wherein the RF choke is separated from the reflector by a distance approximately equal to an integral multiple of one-half of a wavelength of an electromagnetic radiation in the electromagnetic radiation resonator.

19. The particulate filter apparatus of claim 9, wherein the absorber is capable of absorbing a magnetic field component and an electric field portion of electromagnetic radiation.

20. The particulate filter apparatus of claim 9, further comprising an electromagnetic frequency source configured to generate electromagnetic radiation.

21. The particulate filter apparatus of claim 9, wherein the particulate filter is composed of a ceramic material.

22. The particulate filter apparatus of claim 9, wherein the absorber is selected from a group consisting of silicon carbide and indium tin oxide.

23. The particulate filter apparatus of claim 9, wherein the electromagnetic radiation resonator is a microwave resonator.

24. A particulate filter apparatus comprising:
   a) a filter for collecting a particulate; and
   b) a microwave resonator extending part way into the filter, the microwave resonator comprising:
      (i) a microwave reflector configured to inhibit microwave radiation from propagating all the way through the filter, wherein the microwave reflector is within the filter; and
      (ii) an absorber in the electromagnetic resonator capable of heating to a temperature sufficient to ignite the particulate at the absorber in response to the microwave radiation, wherein the absorber is spaced apart from the microwave reflector.

25. A method of manufacturing a particulate filter comprising:
   depositing a microwave reflective coating at an end of a filter; and
   depositing an absorptive coating adjacent the microwave reflective coating, the absorptive coating being capable of absorbing a magnetic field component of microwave radiation.

26. The method of claim 25, wherein depositing the absorptive coating adjacent the reflecting coating comprises depositing the absorptive coating over at least a portion of the microwave reflective coating.

27. A method of manufacturing a particulate filter comprising:
   depositing a microwave reflective coating over a portion of a particulate filter; and
   depositing an absorptive coating over a portion of the particulate filter, the absorptive coating being capable of absorbing an electric field component of microwave radiation.

28. A method of manufacturing a particulate filter comprising:
   depositing an absorptive coating over an end of a first filter portion, the absorptive coating capable of absorbing an electric field component of microwave radiation;
   depositing a microwave reflective coating over an end of a second filter portion; and
   mounting the first filter portion to the second filter portion with the microwave reflective coating being located between the first filter portion and the second filter portion.

29. The method of claim 28, wherein mounting the first filter portion to the second filter portion comprises performing a thermal consolidation process.

30. A method of manufacturing a particulate filter comprising:
   depositing an absorptive coating over a first end of a first filter portion, the absorptive coating capable of absorbing an electric field component of microwave radiation;
   depositing a microwave reflective coating over a second end of the first filter portion; and
   mounting the first filter portion to a second filter portion with the microwave reflective coating being located between the first filter portion and the second filter portion.

31. The method of claim 30, wherein mounting the first filter portion to the second filter portion comprises performing a thermal consolidation process.

32. The particulate filter apparatus of claim 4, wherein the unitary filter further comprises the absorber.

33. The particulate filter apparatus of claim 32, wherein the absorber is composed of a ferrite material.

34. The particulate filter apparatus of claim 32, wherein the absorber comprises a nonmetallic magnetic material disbursed in a binder.

35. The particulate filter apparatus of claim 32, wherein the absorber comprises a metallic magnetic material disbursed in a binder.

36. The particulate filter apparatus of claim 9, further comprising an enclosure containing the particulate filter, the enclosure having input and output gas flow openings, the input gas flow opening comprising an input reflector associated therewith.

37. A particulate filter apparatus comprising:
   a) a filter portion configured to collect a particulate;
   b) a reflector configured to inhibit electromagnetic radiation from propagating through the filter portion;
   c) an absorber configured to heat to a temperature sufficient to ignite the particulate in response to the electromagnetic radiation; and
   d) an electromagnetic supply spaced apart from the reflector such that electromagnetic radiation is introduced into an area of the resonating chamber away from the reflector.

38. The particulate filter apparatus of claim 37, wherein the reflector is adjacent to the filter portion.

39. The particulate filter apparatus of claim 38, wherein the absorber is adjacent to the reflector.

40. A particulate filter apparatus comprising:
   a) an enclosure having input and output gas flow openings, the input gas flow opening comprising an input reflector associated therewith;
   b) a particulate filter comprising an absorber and a filter reflector both adjacent to an electromagnetic source end of the particulate filter;
   c) an electromagnetic radiation resonator adjacent to the electromagnetic source end, the electromagnetic radiation resonator extending to the reflector such that the absorber is in the electromagnetic radiation resonator; and
   d) an electromagnetic supply adjacent to the input gas flow opening and spaced apart from the filter reflector such that electromagnetic radiation is inserted into an area of the resonator away from the filter reflector.

41. The particulate filter apparatus of claim 40, wherein the filter reflector is adjacent to the filter portion.

42. The particulate filter apparatus of claim 41, wherein the absorber is adjacent to the filter reflector.

* * * * *